UNITED STATES PATENT OFFICE.

WILLIAM A. BROWN, OF MONTGOMERY, ALABAMA.

COFFEE SUBSTITUTE.

1,224,271. Specification of Letters Patent. Patented May 1, 1917.

No Drawing. Application filed August 5, 1916. Serial No. 113,371.

*To all whom it may concern:*

Be it known that I, WILLIAM A. BROWN, a citizen of the United States, residing at Montgomery, in the county of Montgomery and State of Alabama, have invented certain new and useful Improvements in Coffee Substitutes, of which the following is a specification.

This invention has relation to a compound to be used as a substitute for coffee, and the process of preparing the same.

An object of the invention is to provide a coffee substitute consisting chiefly of sweet potatoes, prepared in a manner to be hereinafter described, with the addition of prepared velvet beans.

In the preparation of the compound, sweet potatoes are peeled and cut into small cubes, or otherwise comminuted, and dried over a slow fire, then roasted, and ultimately ground into powdered or otherwise reduced to granular form.

Velvet beans, a legume, extensively cultivated in the Southern States and heretofore not used for food, are scalded and the skin removed. The beans after such treatment are then roasted and ground into powder form.

A compound of the above named ingredients is then made consisting of 95% of the sweet potato powder, and 5% of the velvet bean powder. These ingredients are thoroughly mixed, and if desired may be subjected to another grinding process to further reduce the size of the particles and to insure a more homogeneous mixture.

A decoction of the compound may be made by boiling a certain proportion thereof with water whereby a wholesome and acceptable drink may be prepared. A lesser proportion of the compound than coffee may be used to produce a drink of corresponding strength. While the proportions of the ingredients as herein given have been found to produce the best results in practice, I do not wish to be limited to the proportions given, but reserve the right and privilege of changing the proportions, or to substitute another material than sweet potatoes when used in connection with velvet beans as a substitute for coffee.

Having thus described my invention what I claim as new and desire to secure by Letters Patent is:—

1. A substitute for coffee consisting of sweet potatoes and velvet beans, dried, roasted and powdered, and mixed together in the proportions of approximately 95% of sweet potato powder and 5% of velvet bean powder.

2. The herein described process for the manufacture of a coffee substitute which consists in comminuting sweet potatoes, drying, roasting and pulverizing the comminuted product, next scalding and peeling velvet beans, drying and pulverizing them and finally mixing together the potato and velvet bean powders in proportions of ninety-five per cent. of sweet potato powder, and five per cent. of velvet bean powder.

In testimony whereof I affix my signature in presence of two witnesses.

WILLIAM A. BROWN.

Witnesses:
T. G. FLINN,
H. W. GRAVES.

Copies of this patent may be obtained for five cents each, by addressing the "Commissioner of Patents, Washington, D. C."